US006836691B1

(12) United States Patent
Stirton

(10) Patent No.: US 6,836,691 B1
(45) Date of Patent: Dec. 28, 2004

(54) METHOD AND APPARATUS FOR FILTERING METROLOGY DATA BASED ON COLLECTION PURPOSE

(75) Inventor: James B. Stirton, Austin, TX (US)

(73) Assignee: Advanced Micro Devices, Inc., Austin, TX (US)

(*) Notice: Subject to any disclaimer, the term of this patent is extended or adjusted under 35 U.S.C. 154(b) by 0 days.

(21) Appl. No.: 10/427,620

(22) Filed: May 1, 2003

(51) Int. Cl.$^7$ .............................................. G06F 19/00
(52) U.S. Cl. ....................................... 700/108; 702/85
(58) Field of Search ......................... 700/108, 95, 110, 700/117; 702/85; 709/108, 320; 712/228; 714/25, 54; 438/12; 345/708

(56) References Cited

U.S. PATENT DOCUMENTS

| | | | |
|---|---|---|---|
| 5,864,773 A | * 1/1999 | Barna et al. ................... | 702/85 |
| 5,867,276 A | 2/1999 | McNeil et al. ............... | 356/445 |
| 5,877,860 A | 3/1999 | Borden ........................ | 356/376 |
| 5,880,838 A | 3/1999 | Marx et al. .................. | 356/351 |
| 5,896,294 A | * 4/1999 | Chow et al. ................. | 700/121 |
| 6,051,348 A | 4/2000 | Marinaro et al. ............. | 430/30 |
| 6,081,334 A | 6/2000 | Grimbergen et al. ........ | 356/357 |
| 6,141,107 A | 10/2000 | Nishi et al. .................. | 356/401 |
| 6,245,584 B1 | 6/2001 | Marinaro et al. ............. | 438/14 |
| 6,263,255 B1 | * 7/2001 | Tan et al. ..................... | 700/121 |
| 6,319,884 B2 | 11/2001 | Leduc et al. ................. | 510/175 |
| 6,383,888 B1 | 5/2002 | Stirton ......................... | 438/401 |
| 6,423,977 B1 | 7/2002 | Hayasaki et al. ....... | 250/559.19 |
| 6,433,878 B1 | 8/2002 | Niu et al. .................... | 356/603 |
| 6,456,899 B1 | * 9/2002 | Gleason et al. .............. | 700/212 |
| 6,473,665 B2 | * 10/2002 | Mugibayashi et al. ...... | 700/110 |
| 6,479,200 B1 | 11/2002 | Stirton ......................... | 430/30 |
| 6,529,282 B1 | 3/2003 | Stirton et al. ................ | 356/630 |
| 2002/0135781 A1 | 9/2002 | Singh et al. ................. | 356/601 |

OTHER PUBLICATIONS

Kenneth W. Tobin, Thomas P Karnoswski, Fred Lakhani, "Technology Consideration For Future Semiconductor Data Management Systems", Oak Ridge National Laboratory1, Oak Ridge, TN, USA.*

Kenneth W. Tobin, Thomas P Karnoswski, Fred Kakhani, "Integrated applications of inspection data in the semiconductor manufacturing environment", Oak Ridge National Laboratory1, Oak Ridge, TN, USA.*

(List continued on next page.)

*Primary Examiner*—Leo Picard
*Assistant Examiner*—Carlos R. Ortiz
(74) *Attorney, Agent, or Firm*—Williams, Morgan & Amerson

(57) ABSTRACT

A method includes collecting metrology data related to the processing of workpieces in a plurality of tools. Context data for the metrology data is generated. The context data includes collection purpose data. The metrology data is filtered based on the collection purpose data. A process control activity related to one of the tools is conducted based on the filtered metrology data. A system includes at least one metrology tool, a computer, and a process controller. The metrology tool is configured to collect metrology data related to the processing of workpieces in a plurality of tools. The computer is configured to generate context data for the metrology data, the context data including collection purpose data. The process controller is configured to filter the metrology data based on the collection purpose data and conduct a process control activity related to one of the tools based on the filtered metrology data.

20 Claims, 2 Drawing Sheets

OTHER PUBLICATIONS

R. Sherman, E. Tirosh, Z. Smilansky, "Automatic Defect Classification System for Semiconductor Wafers", Machine Vision Applications in Industrial Inspection, SPIE vol. 1907, p. 72, May 1993.*

T.P. Karnowski, K.W. Tobin, R.K. Ferrell, and F. Lakhani, "Content Based Image Retrievel for Semiconductor Manufacturing", IS&T/SPIE's 12th International Symposium on Electronic Imaging: Science and Technology, San Jose Convention Center, Jan. 2000.*

Kenneth W. Tobin, Thomas P Karnowski, Fred Lakhani, Jul. 2000, "Technology Consideration For Future Semiconductor Data Management Systems", Oak Ridge National Laboratory1, Oak Ridge, TN, USA.*

Kenneth W. Tobin, Thomas P Karnowski, Fred Lakhani, Jan. 2001, "Integrated applications of inspection data in the semiconductor manufacturing environment", Oak Ridge National Laboratory1, Oak Ridge, TN, USA.*

U.S. Appl. No. 09/827,453, entitled "Method of Controlling Stepper Process Parameters Based Upon Optical Properties of Incoming Process Layers, and System for Accomplishing Same," filed Apr. 6, 2001.

U.S. Appl. No. 10/005,486, entitled "Method of Using Scatterometry Measurements to Control Stepper Process Parameters," filed Nov. 8, 2001.

U.S. Appl. No. 10/084,987, entitled "Method of Using High Yielding Spectra Scatterometry Measurements to Control Semiconductor Manufacturing Processes, and Systems for Accomplishing Same," filed Feb. 28, 2002.

U.S. Appl. No. 10/404,026, entitled "Method of Using Adaptive Sampling Techniques to Quantify Tool Performance, and System for Performing Same," filed Apr. 3, 2003.

* cited by examiner

US 6,836,691 B1

METHOD AND APPARATUS FOR FILTERING METROLOGY DATA BASED ON COLLECTION PURPOSE

BACKGROUND OF THE INVENTION

1. Field of the Invention

This invention relates generally to an industrial process, and, more particularly, to a method and apparatus for filtering metrology data based on collection purpose in a semiconductor device manufacturing environment

2. Descripiion of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a wafer using a variety of processing tools, including photolithography steppers, etch tools, deposition tools, polishing tools, rapid thermal processing tools, implantation tools, etc. One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process.

Often, semiconductor devices are staged through multiple manufacturing tools for multiple processes, generating data relating to the quality of the processed semiconductor devices. Pre-processing and/or post-processing metrology data is collected on a regular basis, generally in accordance with a sampling plan, for process control purposes. The collected metrology data is used by the process controllers for the tools. Operating recipe parameters are calculated by the process controllers based on the performance model and the metrology information to attempt to achieve post-processing results as close to a process target value as possible. Reducing variation in this manner leads to increased throughput, reduced cost, higher device performance, etc., an of which equate to increased profitability.

Metrology data is also used for other purposes not related to process control. One such use is for fault detection and classification (FDC). Fault monitors apply FDC techniques to identify devices or tools with fault conditions. For example, if a particular device has a critical dimension outside a predetermined range, it is flagged as being defective. The wafer may be reworked, the die may be marked defective, or the wafer may be scrapped, depending on the magnitude and nature of the fault condition. Process tools may be monitored during their processing runs. If an anomaly is observed during the processing, the tool may be shut down for maintenance. The wafers processed by the tool may be flagged for subsequent metrology to determine if the tool anomaly caused a degradation of the devices formed thereon. Again, the suspect wafers may be reworked or scrapped.

Typically, when a process controller gathers metrology data to update its control model or generate a control action for subsequent processing, it retrieves metrology data related to wafers processed in the tool or tools under its control and employs that data to perform its control task. The data retrieved includes metrology data collected through the regular sampling plans implemented in the facility, and the metrology data collected for other purposes. Some of the metrology data does not accurately reflect the state of the process or the devices manufactured. For example, devices processed by a tool that was malfunctioning may have characteristics that were affected by the malfunction (Le., a special cause) rather than by normal process variation (i.e., common cause). Employing this data for use in process control routines may introduce a source of variation that cannot be addressed by the process controller and thus reduce the effectiveness of the process controller.

The present invention is directed to overcoming, or at least reducing the effects of, one or more of the problems set forth above.

SUMMARY OF THE INVENTION

One aspect of the present invention is seen in a method for filtering metrology data. The method includes collecting metrology data related to the processing of workpieces in a plurality of tools. Context data for the metrology data is generated. The context data includes collection purpose data. The metrology data is filtered based on the collection purpose data. A process control activity related to one of the tools is conducted based on the filtered metrology data.

Another aspect of the present invention is seen in a system including at least one metrology tool, a computer, and a process controller. The metrology tool is configured to collect metrology data related to the processing of workpieces in a plurality of tools. The computer is configured to generate context data for the metrology data, the context data including collection purpose data. The process controller is configured to filter the metrology data based on the collection purpose data and conduct a process control activity related to one of the tools based on the filtered metrology data.

BRIEF DESCRIPTION OF THE DRAWINGS

The invention may be understood by reference to the following description taken in conjunction with the accompanying drawings, in which like reference numerals identify like elements, and in which.

Figure 1:
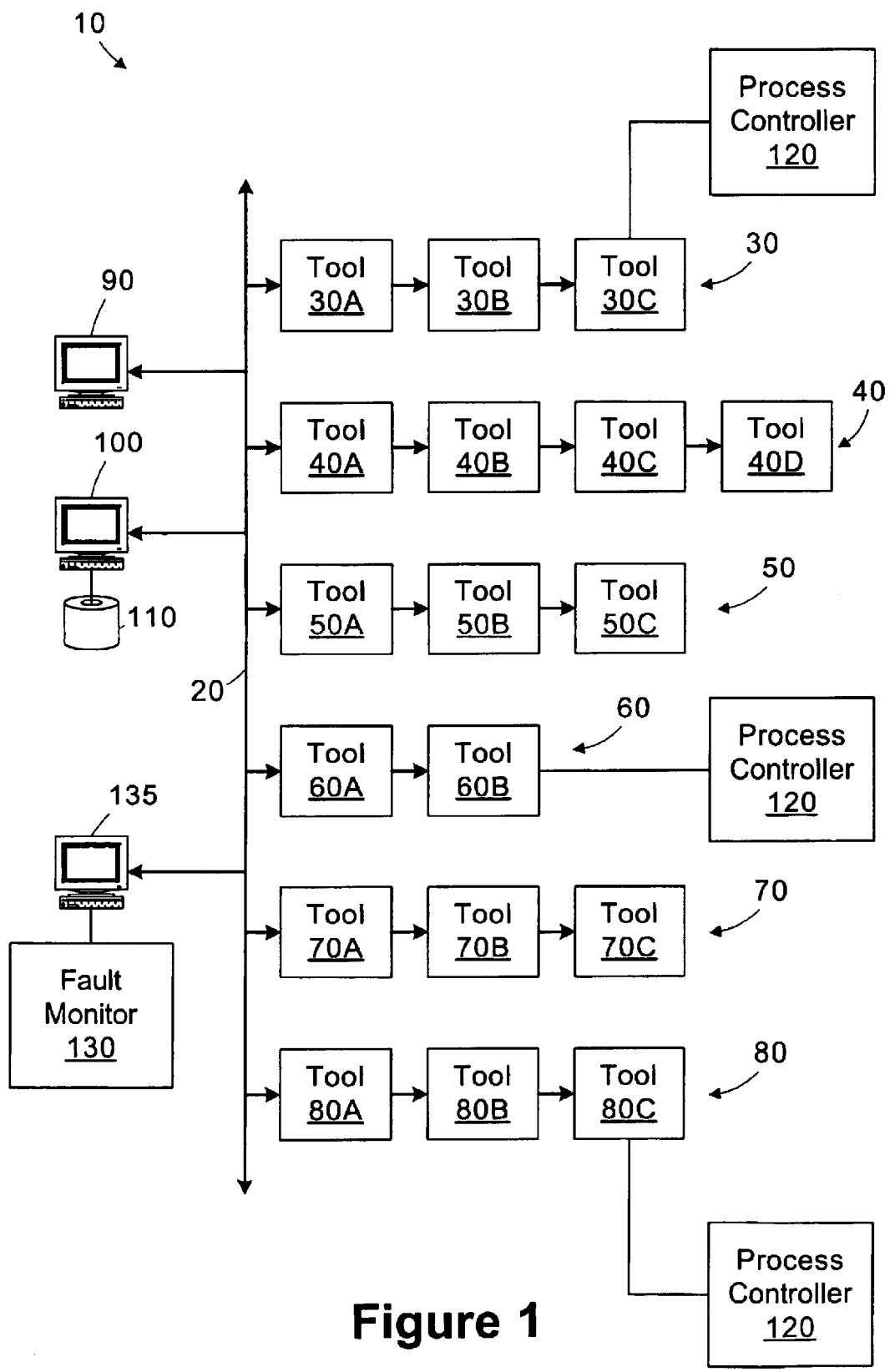
FIG. 1 is a simplified block diagram of a manufacturing system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30–80. Each of the tools 30–80 may be coupled to a computer (not shown) for interfacing with the network 20. The tools 30–80 are grouped into sets of like tools, as denoted by lettered suffixes. For example, the set of tools 30A–30C represent tools of a certain type, such as a chemical mechanical planarization tool. A particular wafer or lot of wafers progresses through the tools 30–80 as it is being manufactured, with each tool 30–80 performing a specific function in the process flow. Exemplary processing tools for a semiconductor device fabrication environment include photolithography steppers, etch tools, deposition tools, polishing tools, rapid thermal processing tools, implantation tools, etc. Exemplary metrology tools include thickness metrology tools, scanning electron microscopes, optical metrology tools, electrical measurement tools, etc. The tools 30–80 are illustrated in a rank and file grouping for illustrative purposes only. In an actual implementation, the tools 30–80 may be arranged in any physical order or grouping. Additionally, the connections between the tools in a particular grouping are meant to represent connections to the network 20, rather than interconnections between the tools 30–80.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI, which is headquartered in Mountain View, Calif.

A manufacturing execution system (MES) server 90 directs the high level operation of the manufacturing system 10. The MES server 90 monitors the status of the various entities in the manufacturing system 10 (i.e., lots, tools 30–80) and controls the flow of articles of manufacture (e.g., lots of semiconductor wafers) through the process flow. A database server 100 may be provided for storing data related to the status of the various entities and articles of manufacture in the process flow. The database server 100 may store information in one or more data stores 110. The data may include pre-process and post-process metrology data, tool states, lot priorities, etc.

The processing and data storage functions are distributed amongst the different computers or workstations in FIG. 1 to provide general independence and central information storage. Of course, different numbers of computers and different arrangements may be used without departing from the spirit and scope of the instant invention.

Process controllers 120 may be associated with one or more of the process tools 30–80. The process controllers 120 determine control actions for controlling selected ones of the tools 30–80 serving as process tools based on metrology data collected during the fabrication of wafers (i.e., by others of the tools 30–80 serving as metrology tools). The particular control models used by the process controllers 120 depend on the type of process tool 30–80 being controlled, and the particular metrology data collected for use in conjunction with the control models depends on the feature being formed by the particular process tool 30–80. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary process control scenario involves the control of a gate electrode critical dimension (CD) in a transistor structure. Various processes and process variables may be controlled to affect the gate electrode CD. For example, a photoresist mask is used to pattern the gate electrode. The photolithography processes used to form the mask may affect the dimensions of the pattern and thus the dimensions of the gate electrode formed by an etch process using the mask. Exposure time and energy may be controlled to affect the dimensions of the mask. The parameters (e.g., etch time, plasma power, etch gas makeup and concentration, etc.) of the etch process may also affect the CD of the completed gate electrode and may be controlled by a process controller 120. The processes and variables described above that affect the gate electrode CD are not exhaustive. Other processes may be performed that have an impact of the CD and other variables of those processes may be controlled.

In some embodiments, a fault monitor 130 executing on a workstation 135 may be provided for monitoring fault conditions with the tools 30–80 and/or devices manufactured. For example, a particular tool 30–80 may be performing poorly or feature formed on a device may have a dimension outside an acceptable range of values. The fault monitor 130 may implement one or more fault detection and classification (FDC) models to evaluate the condition of the various entities or devices. Metrology data is employed by the fault monitor 130 to identify fault conditions with various tools 30–80 or workpieces and also to update the FDC model(s) employed to identify the degraded conditions. The fault monitor 130 may use the metrology data collected for process control purposes to perform its defect analysis. For example, metrology data collected during a photolithography process for forming the gate electrode etch mask may be used to control the photolithography tool 30–80. The fault monitor 130 may also review the data to determine if the dimensions of the mask are within acceptable limits. If the mask dimensions are outside the acceptable range, the photoresist layer may be removed and the wafer reworked to form a new photoresist layer.

In other cases, the fault monitor 130 may target certain tools 30–80 or wafers for fault analysis and issue its own metrology requests for data related to the targeted tool 30–80 or wafer. For example, if a particular tool parameter is outside a range of expected values during a processing run, wafers processed during that run may be targeted for metrology to determine if the parameter excursion introduced a defect in the processed device. The fault monitor 130 may also initiate metrology events in cases where the probability of defect is higher than a baseline probability. For example, if a process is known to produce a higher defect rate on a particular region of wafer (e.g., the periphery region), the fault monitor 130 may request that additional metrology data be collected for that particular region.

The MES server 90 may receive requests from various consumers to collect metrology data. These consumers may be fault detection entities or process control entities, for example. The metrology tool (e.g., one of the tool 30–80) collects the metrology data and the data is stored in the data store 110. The metrology data may be stored directly by the metrology tool 30–80 or the data may be returned to the MES server 90 for storage. The metrology data is stored also with associated context data that includes identification data and collection purpose data.

Exemplary identification data includes lot identification number (ID), wafer ID, location data (e.g., location of measurement on die or wafer), process-operation data (e.g., last completed step in the fabrication process), etc. The collection purpose data indicates the initial purpose for the collection of the metrology data. For example, the purpose may be process control sampling, fault detection sampling, targeted fault detection, etc.

In one illustrative embodiment of the present invention, the collection purpose data is used to filter the metrology data for subsequent uses. For example, a process controller 120 would conventionally employ all metrology data for a particular tool 30–80 and process-operation operation for updating the states of its control model and generating a control action for modifying an operating recipe parameter for the tool 30–80. By using the collection purpose data to filter the metrology data, metrology data collected for fault detection purposes, where the likelihood of a fault being present is higher, can be excluded. Filtering the metrology data in this manner may improve the performance of the process controller 120 by removing outlier data that exhibits variation from a source other than normal process variation. If the process controller 120 were to act on metrology data that included special causes of variation (e.g., tool faults), it would attempt to shift the process in a direction that might actually increase variation and reduce the stability of the process.

In some cases, metrology data collected for process control purposes may also be used in fault detection. The MES server 90 would initially indicate that the collection purpose would be process control sampling. However, if the metrology data was later used in a fault detection analysis and the wafer was determined to be faulty, the MES server 90 or fault monitor 130 may change the collection purpose such that the metrology data would be filtered out for subsequent process control activities. For example, the MES server 90 may set the collection purpose data to a value indicating a known faulty wafer. However, if the metrology data indicated a fault condition that could be tracked back to a process variation cause, the metrology data may still be useful for process control purposes and the MES server may leave the collection purpose data unchanged.

Some fault detection sampling data may also be randomly collected. In such cases, a defect condition is not suspected, and the data is used for process oversight. Hence, it may be possible that the data collected for fault detection purposes may still be useful for process control. In these cases, where the initial purpose was fault detection, but no defect identified, the MES server 90 or fault monitor 130 may change the collection purpose data to a value indicating this condition, such that the metrology data so collected could still be used for process control purposes.

Table 1 below list exemplary collection purpose codes that may be stored with the collected metrology data. The list is intended to be illustrative and not exhaustive or limiting to the application of the present invention.

TABLE 1

Collection Purpose Codes

| CP Code | Collection Purpose |
| --- | --- |
| 01 | Process Control Sampling |
| 02 | Fault Detection Sampling |
| 03 | Targeted Fault Detection |
| 88 | Fault Detection — no fault identified |
| 99 | Known Defective |

The following examples illustrate the use of the collection purpose codes for filtering the metrology data. Process control data is collected in accordance with a sampling plan implemented by the MES server 90 or other sampling controller (not shown). The collection purpose code for this data is set at "01." The fault monitor 130 requests metrology data for random FDC oversight. The collection purpose code for this data is set at "02." The fault monitor 130 may also use the "01" data for FDC oversight. In some cases the fault monitor 130 may identify that a particular tool parameter was outside expected limits during a processing run or that the health of a particular tool 30–80 has degraded to a level indicating a need for maintenance or troubleshooting. The fault monitor 130 may request additional metrology data be collected for wafers processed during the particular process run or by the degraded tool 30–80. This targeted fault detection data would have a collection purpose code of "03"analysis of the "01" and "02" indicates that a fault condition may exist, additional metrology data may be requested. Such additional metrology data would have a collection purpose code of "03."

If the fault monitor 130 identifies a faulty die or wafer, it may change the collection purpose code of the "01" or "02" or "03" data to "99." If no fault is identified for the "02" or "03" data, the fault monitor 130 may change the collection purpose code to "88." In some embodiments, user intervention may be required before the collection purpose code can be changed. For example, the metrology data collected for targeted fault detection may indicate that the processed devices are satisfactory, however, variation may have been introduced by the observed condition that led to the targeting. In such cases, the metrology data may not be useful for process control due to the presence of the additional source of variation, and the collection purpose code may remain unchanged. User input may be used to determine if the variation is of this type, and the collection purpose code should not be changed.

When the process controller 120 gathers metrology data for process control purposes (e.g., state update or control action generation), it filters the metrology data, so that data that is less useful for process control purposes is ignored. For example, the process controller 120 may gather "01," "02," and "88" data and exclude the metrology data where fault conditions are more likely to exist (Le., the "03" and "99" data). Filtering the data in this manner may increase the efficacy of the process controller 120 because non-process sources of variation; may be removed from the data set used for the process control purpose.

Figure 2:
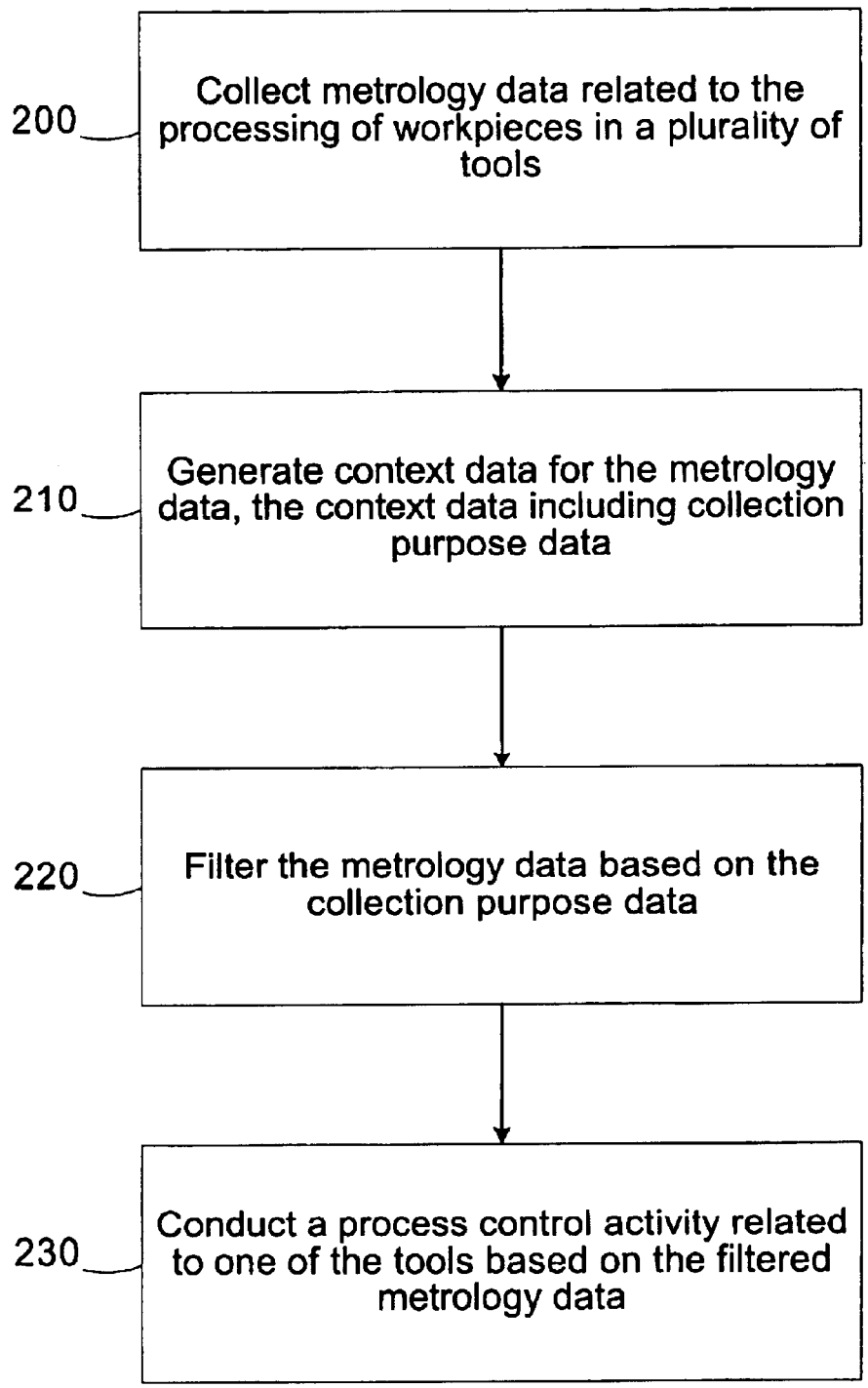
FIG. 2 is a simplified flow diagram of a method for filtering metrology data in accordance with another embodiment of the present invention.

Turning now to FIG. 2, a simplified flow diagram of a method for filtering metrology data in accordance with another embodiment of the present invention is provided. In block 200, metrology data related to the processing of workpieces in a plurality of tools is collected. In block 210, context data for the metrology data is generated. The context data includes collection purpose data. In block 220, the metrology data is filtered based on the collection purpose data. In block 230, a process control activity related to one of the tools is conducted based on the filtered metrology data.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

collecting metrology data related to the processing of workpieces in a plurality of tools;

generating context data for the metrology data, the context data including collection purpose data;

filtering the metrology data based on the collection purpose data; and conducting a process control activity related to one of the tools based on the filtered metrology data.

2. The method of claim 1, wherein generating the context data further comprises generating identification data associated with the metrology data, and filtering the metrology data further comprises filtering the metrology data based on the identification data and the collection purpose data.

3. The method of claim 1, wherein generating the context data further comprises generating collection purpose data indicating at least one of a process control sampling purpose, a fault detection sampling purpose, and a targeted fault detection purpose.

4. The method of claim 1, further comprising:

identifying a fault condition for a workpiece based on the metrology data; and changing the collection purpose data responsive to identifying the fault condition.

5. The method of claim 1, further comprising:

identifying an absence of a fault condition for a workpiece based on the metrology data; and changing the collection purpose data responsive to identifying the absence of the fault condition.

6. The method of claim 1, wherein conducting the process control activity further comprises updating a state of a control model employed by a process controller associated with one of the tools.

7. The method of claim 1, wherein conducting the process control activity further comprises determining at least one parameter of an operating recipe employed by one of the tools.

8. The method of claim 1, wherein filtering the metrology data further comprising excluding metrology data associated with a potential defect condition based on the collection purpose data.

9. The method of claim 1, further comprising storing the metrology data and the context data in a data store.

10. A system, comprising:

at least one metrology tool configured to collect metrology data related to the processing of workpieces in a plurality of tools;

a computer configured to generate context data for the metrology data, the context data including collection purpose data; and a process controller configured to filter the metrology data based on the collection purpose data and conduct a process control activity related to one of the tools based on the filtered metrology data.

11. The system of claim 10, wherein the context data further comprises identification data associated with the metrology data, and the process controller is further configured to filter the metrology data based on the identification data and the collection purpose data.

12. The system of claim 10, wherein the collection purpose data indicates at least one of a process control sampling purpose, a fault detection sampling purpose, and a targeted fault detection purpose.

13. The system of claim 10, further comprising a fault monitor configured to identify a fault condition for a workpiece based on the metrology data, wherein at least one of the computer and the fault monitor is configured to change the collection purpose data responsive to identifying the fault condition.

14. The system of claim 10, further comprising a fault monitor configured to identify an absence of a fault condition for a workpiece based on the metrology data, wherein at least one of the computer and the fault monitor is further configured to change the collection purpose data responsive to identifying the absence of the fault condition.

15. The system of claim 10, wherein the process controller is further configured to update a state of a control model employed by a process controller associated with one of the tools based on the filtered metrology data.

16. The system of claim 10, wherein the process controller is further configured to determine at least one parameter of an operating recipe employed by one of the tools based on the filtered metrology data.

17. The system of claim 10, wherein the process controller is further configured to filter the metrology data by excluding metrology data associated with a potential defect condition based on the collection purpose data.

18. The system of claim 10, further comprising a data store configured to store the metrology data and the context data.

19. The system of claim 1, wherein the computer comprises at least one of a manufacturing execution system server and a fault monitor.

20. A system, comprising:

means for collecting metrology data related to the processing of workpieces in a plurality of tools;

means for generating context data for the metrology data, the context data including collection purpose data;

means for filtering the metrology data based on the collection purpose data; and means for conducting a process control activity related to one of the tools based on the filtered metrology data.

* * * * *